United States Patent [19]

Takimoto et al.

[11] Patent Number: 4,761,333
[45] Date of Patent: Aug. 2, 1988

[54] STEERING WHEEL

[75] Inventors: Masahiro Takimoto; Satoshi Ohta; Yoshio Yamazaki, all of Aichi, Japan

[73] Assignee: Toyoda Gosei Co., Ltd., Nishikasugai, Japan

[21] Appl. No.: 81,336

[22] Filed: Aug. 4, 1987

[30] Foreign Application Priority Data

Aug. 9, 1986 [JP] Japan .................. 61-187572

[51] Int. Cl.$^4$ .................. B62D 1/06; B32B 27/00; B32B 21/02
[52] U.S. Cl. .................. 428/327; 74/552; 74/558; 428/424.6; 428/424.7
[58] Field of Search ............ 428/65, 66, 424.6, 424.7, 428/327; 74/552, 558

[56] References Cited

U.S. PATENT DOCUMENTS

| | | | |
|---|---|---|---|
| 3,802,291 | 4/1974 | Young, Jr. et al. | 74/552 |
| 4,579,775 | 4/1986 | Ohta et al. | 74/558 |
| 4,640,150 | 2/1987 | Kobayashi et al. | 74/552 |

Primary Examiner—William J. Van Balen
Attorney, Agent, or Firm—Cushman, Darby & Cushman

[57] ABSTRACT

A steering wheel is described, which comprises a core that is covered with a synthetic resin covering material which is overlaid with a coating film thereon, wherein said covering material is formed using an injection molding method by a resin composition that comprises 100 parts by weight of a polyvinyl chloride resin, 100 to 200 parts by weight of a phthalic acid ester based plasticizer represented by formula (I) and 10 to 40 parts by weight of an acrylonitrile-butadiene rubber:

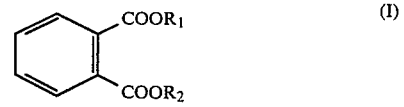

wherein $R_1$ and $R_2$ are each an alkyl group, provided that when the total number of mols of $R_1$ and $R_2$ is 100 mol, a monomethyloctyl group is present in an amount of 10 to 60 mols, while a dimethylheptyl group is present in an amount of 30 to 70 mols.

4 Claims, 1 Drawing Sheet

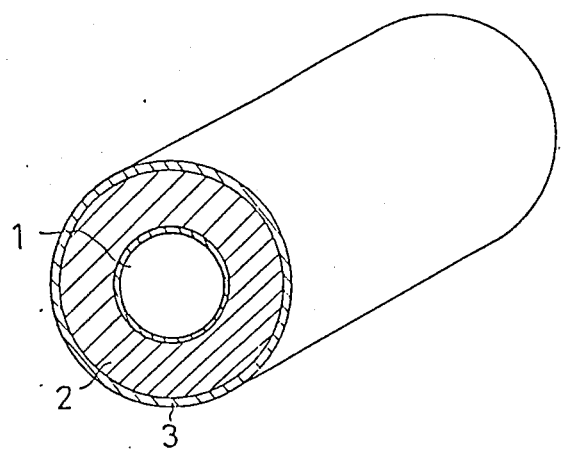

STEERING WHEEL

FIELD OF THE INVENTION

The present invention relates to a steering wheel that is intended to be mainly used as an automotive part.

BACKGROUND OF THE INVENTION

The principal function of automotive steering wheels is, of course, steering the car. In addition, steering wheels which are kept in contact with the driver's hands while the car is running must satisfy several other requirements, among which the following are important: (1) good appearance, (2) good touch to the hands of the drivers, (3) high resistance to ultraviolet radiation, and (4) high resistance to wear due to constant friction with the hands of the drivers.

"Soft touch" steering wheels (that is, steering wheels which are soft to the touch) that satisfy these requirements are inclined to be desired by drivers in recent years, and as a consequence, the use of "rigid" resins such as polypropylene and butyl cellulose as materials of steering wheels is shifting to the adoption of foamed polyurethane.

The polyurethane foams used in the prior art are formed from expensive raw materials such as polyols and isocyanates. In addition, they are shaped into steering wheels by complex forming methods. For these reasons, steering wheels made of polyurethane foams are costly. A further problem with polyurethane foams is that the molecular chains of polyurethane are easily broken upon exposure to ultraviolet radiation, and therefore, the skin of a steering wheel made of such polyurethane foams has a tendency to deteriorate as a result of prolonged use.

Soft (flexible) vinyl chloride resins are currently used as the material for steering wheels having a soft touch and being inexpensive. However, non-foamed vinyl chloride resins have a comparatively high hardness and do not fully meet the demand of users requiring the soft touch steering wheels. If a steering wheel is formed by foamed vinyl chloride resins using an efficient injection molding method, defects such as "flow marks" or "swirl marks" are caused in the molded product. These defects extend to such a deep area of the product that they cannot be completely masked by any subsequently applied coating. Forming techniques other than the injection molding methods are inefficient and costly. Therefore, no manufacturer has yet succeeded in making steering wheels from soft (flexible) vinyl chloride resins having a hardness of 60 Hs or less that can be produced at low cost (cost effectiveness is one of the important factors in mass production of automotive parts) and which have soft touch that is comparable to that of products made from polyurethane foams.

SUMMARY OF THE INVENTION

An object of the present invention is to obtain a steering wheel having a strong adhesion between an injection molded product of a resin composition and a coating film, a soft touch to the hands of the drivers, and a lower manufacturing cost.

The above problems of the prior art can be solved by the steering wheel of the present invention which comprises a core that is covered with a synthetic resin covering material which is overlaid with a coating film thereon, wherein the covering material is formed using an injection molding method by a resin composition that comprises 100 parts by weight of a polyvinyl chloride resin, 100 to 200 parts by weight of a phthalic acid ester based plasticizer represented by formula (I), and 10 to 40 parts by weight of an acrylonitrile-butadiene rubber:

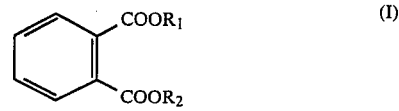

wherein $R_1$ and $R_2$ are each an alkyl group, provided that when the total number of mols of $R_1$ and $R_2$ is 100 mol, a monomethyloctyl group is present in an amount of 10 to 60 mols, while a dimethylheptyl group is present in an amount of 30 to 70 mols.

BRIEF DESCRIPTION OF THE DRAWING

The drawing is a partial cutaway perspective view of the ring portion of a steering wheel prepared in accordance with the present invention.

1: a core
2: a synthetic resin covering material
3: a coating film

DETAILED DESCRIPTION OF THE INVENTION

In the resin composition of the present invention, the phthalic acid ester based plasticizer is used in an amount of 100 to 200 parts by weight, and preferably 120 to 170 parts by weight, based on 100 parts by weight of the polyvinyl chloride resin. If the content of the plasticizer is less than 100 parts by weight, the synthetic resin covering material does not have the desired flexibility. If the content of the plasticizer is more than 200 parts by weight, its miscibility with the synthetic resin is reduced, and whereby bleeding occurs in the synthetic resin covering material.

An acrylonitrile-butadiene rubber (hereinafter referred to as NBR) is used in an amount of 10 to 40 parts by weight, and preferably 20 to 30 parts by weight, based on 100 parts by weight of the polyvinyl chloride resin. If the content of NBR is less than 10 parts by weight, bleeding occurs in the synthetic resin covering material or its adhesion to a subsequently applied coating film for light resistance decreases. If the content of NBR exceeds 40 parts by weight, the synthetic resin covering material has a weak mechanical strength.

The phthalic acid ester based plasticizer represented by formula (I) specified above is either in the form (1) or (2) specified below, in the form of a mixture of (1) and (2), or in the form of a mixture of (1) and/or (2) with (3) which is also specified below. Whichever the case, a monomethyloctyl group is present in an amount of 10 to 60 mols and a dimethylheptyl group in an amount of 30 to 70 mols on the basis of the total number of mols of $R_1$ and $R_2$ which is assumed to be 100: (1) each of $R_1$ and $R_2$ is a monomethyloctyl group or a dimethylheptyl group; more specifically, that is, both $R_1$ and $R_2$ are a monomethyloctyl group, both $R_1$ and $R_2$ are a dimethylheptyl group, or $R_1$ is a monomethyloctyl group and $R_2$ is a dimethylheptyl group; (2) either one of $R_1$ and $R_2$ is a monomethyloctyl or dimethylheptyl group and the other being an alkyl group other than a monomethyloctyl or dimethylheptyl group; or (3) each of $R_1$ and $R_2$ is an alkyl group other than a monomethyloctyl or dimethylheptyl group.

Examples of the alkyl group other than a monomethyloctyl and a dimethylheptyl group include groups having 9 to 10 carbon atoms such as trimethylhexyl, n-nonyl, decyl groups, etc. In addition to these alkyl groups, those having 11 or more carbon atoms or those which have no more than 8 carbon atoms may be present in trace amounts (i.e., 1 wt % or less).

The synthetic resin which can be used as covering materials in the present invention may be a foamed or non-foamed resin but preferably is a non-foamed resin.

In the present invention, a coating film formed on the synthetic resin covering material comprises a polyurethane-based paint containing generally 2 to 10 wt % of nylon beads having an average particle size of 10 to 30 μm. A thickness of a coating film formed is preferably from 10 to 50 μm, and more preferably from 20 to 40 μm. If the coating thickness is less than 10 μm, the wear resistance is decreased, and whereby a steering wheel having the intended wear resistance is not attainable. Even if the coating thickness exceeds 50 μm, no further improvement in wear resistance is attained and then the economical performance becomes unfavorable.

The urethane-based paint used in the present invention may be applied by any known coating method such as a brush coating method, a dip coating method or a spray coating method.

The resin composition of the present invention which comprises the polyvinyl chloride resin, phthalic acid ester and NBR described above is adapted for shaping by efficient injection molding and, in addition, ensures strong adhesion to the coating film formed by subsequent application of a paint.

The present invention is illustrated in more detail by the following examples and comparative examples, but is not limited thereto. In the examples and comparative examples, all parts are by weight, unless otherwise indicated.

EXAMPLES

A cross sectional view of the steering wheel of the present invention is shown in the FIGURE and it consists of a core 1, a synthetic resin covering material 2 fixed around the core 1 by an adhesive, and a coating film 3 formed on the surface of the covering material 2.

Phthalic acid esters having the following three different compositions shown in Table 1 were used as a covering material according to the present invention.

TABLE 1

| Components | A | B | C |
|---|---|---|---|
| Monomethyloctyl group (mol %) | 10 | 40 | 50 |
| Dimethylheptyl group (mol %) | 60 | 50 | 40 |
| Other nonyl isomers and decyl groups (mol %) | 30 | 10 | 10 |

A resin composition comprising 150 parts of a phthalic acid ester (selected from the esters specified above or other phthalate esters as described in Table 1), 100 parts of a polyvinyl chloride resin (degree of polymerization: 2,500), 20 parts of NBR having an acrylonitrile content of 35 wt %, 2 parts of a Ba-Zn based heat stabilizer and 3 parts of an epoxidized soybean oil was injection-molded to form the shape of a steering wheel.

A two-component urethane paint (main component: acrylic polyester polyol; curing component: quick drying and non-yellowing hexamethylene diisocyanate prepolymer) was coated with a spray gun on the molding to form a coating film having a thickness of 20 μm. The coating film was dried in an air oven at 80° C. for 30 minutes and then allowed to stand in the air at 23° C. and 65% R.H. for 24 hours. Thereafter, 100 squares in a checkerboard pattern were cut through the coating film into the surface of the synthetic resin covering material and an adhesive tape was attached to the coating film. The tape was then peeled apart from the coating film in order to measure the initial strength of adhesion between the coating film and the underlying resin covering material. The sample peeled apart was referred to as "P" (unacceptable) if a single square was peeled apart from the resin covering material. Such as adhesion test described in JIS K5400 was repeated ten times.

The samples were then irradiated with UV rays for 400 hours in a UV carbon arc weather meter manufactured by Suga Shikenki K.K. (black panel temperature: 83° C.) in the air at 23° C. and 65% R.H. for 24 hours. The light fastness of the adhesion between the coating film and the underlying synthetic resin covering material after exposure to UV radiation was measured by the same method as described above.

The results of the two tests together with a hardness of each sample are shown in Table 2.

TABLE 2

| Run No. | Plasticizer | Hardness (according to JIS K6301) (Hs) | Adhesion of a Coating Film Initial | Adhesion of a Coating Film After UV Irradiation |
|---|---|---|---|---|
| Example 1 | Phthalic acid ester (A shown in Table 1) | 50 | G | G |
| Comparative Example 1 | Diheptyl phthalate | 45 | P | P |
| Example 2 | Di(2-ethylhexyl) phthalate | 48 | G | P |
| Example 3 | Dinormaloctyl phthalate | 46 | P | P |
| Example 4 | Diisodecyl phthalate | 52 | G | P |
| Example 5 | Diundecyl phthalate | 52 | P | P |
| Example 6 | Straight chain phthalate having from 7 to 9 carbon atoms*[1] | 47 | P | P |
| Example 7 | Straight chain phthalate having from 9 to 11 carbon atoms*[2] | 52 | P | P |
| Example 8 | Tri(2-ethylhexyl)trimellitate | 58 | P | P |

*[1]Linebol 79P of Shell Chemical Co., Ltd.
*[2]Linebol 911P of Shell Chemical Co., Ltd.

It is clearly seen from the results in Table 2 that the steering wheel prepared in Example 1 using the resin composition specified by the present invention had a soft touch (hardness: 60 Hs or less) and exhibited strong adhesion between the resin covering material and the coating film Phthalic acid esters containing the alkyl group having less than 9 carbon atoms have a small molecular size, and whereby are capable of actively moving around in the resin composition so as to be transferred to the interface with the coating film in large quantities. On the other hand, phthalic acid esters containing the alkyl group having more than 9 carbon atoms are not transferred as easily as in the above case, but, on the other hand, their affinity for the coating film is decreased correspondingly and even if the amount of its transfer is small, the plasticizer is built up in a film form at the interface with the coating film and thereby reduces the adhesion between the resin covering material and the coating film.

Plasticizers other than phthalic acid esters are ineffective. Solid plasticizers such as an ethylenevinyl acetate copolymer, Elvaloy and chlorinated polyethylene do not have sufficient plasticizing effects to obtain a soft touch having a hardness of 60 Hs or less. Even liquid plasticizers such as polyesters, phosphate esters, trimellitic acid esters, and straight chained dibasic acid esters are unable to attain the objects of the present invention since they have at least two problems in terms of plasticizing efficiency, miscibility and cost.

Steering wheels were prepared from compositions comprising a phthalic acid ester containing an alkyl group having 9 carbon atoms or one of the phthalate esters specified in Table 1 and varying amounts of NBR. The properties of the prepared steering wheels were measured and evaluated by the same methods as used to obtain the data shown in Table 2. The results are shown in Table 3 below.

NBR, the inexpensive steering wheel having a soft touch which has not heretofore been attainable can be obtained.

The advantages of the steering wheel of the present invention are summarized as follows: it ensures strong adhesion between the injection molded product of a resin composition and the overlying coating film; it has a flexible surface to provide a soft touch to the hands of the driver; and it can be manufactured at low cost.

While the invention has been described in detail and with reference to specific embodiments thereof, it will be apparent to one skilled in the art that various changes and modifications can be made therein without departing from the spirit and scope thereof.

What is claimed is:

1. A steering wheel which comprises a core that is covered with a synthetic resin covering material which is overlaid with a coating film thereon, wherein said covering material is formed using an injection molding method by a resin composition that comprises 100 parts by weight of a polyvinyl chloride resin, 100 to 200 parts by weight of a phthalic acid ester based plasticizer represented by formula (I), and 10 to 40 parts by weight of an acrylonitrile-butadiene rubber:

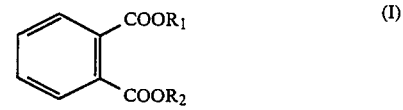

TABLE 3

| Component | Comparative Example | | | | | Example | | | | | | | |
|---|---|---|---|---|---|---|---|---|---|---|---|---|---|
| | 9 | 10 | 11 | 12 | 13 | 2 | 3 | 4 | 5 | 6 | 7 | 8 | 9 |
| Trimethylhexyl phthalate | 150 | | | | 150 | | | | | | | | |
| Phthalic acid ester (A shown in Table 1) | | 150 | | | | 150 | | | | | | | |
| Phthalic acid ester (B shown in Table 1) | | | 150 | | | | 150 | 150 | | 150 | 150 | 200 | |
| Phthalic acid ester (C shown in Table 1) | | | | 150 | | | | | 150 | | | | 200 |
| NBR (26 wt % acrylonitrile) | | | | | | | | | | | 30 | | |
| NBR (35 wt % acrylonitrile) | | | | | 30 | 30 | 30 | 20 | 30 | | | 40 | 40 |
| NBR (50 wt % acrylonitrile) | | | | | | | | | | 30 | | | |
| Properties Evaluated | | | | | | | | | | | | | |
| JIS K6301 hardness (H2s) | 57 | 50 | 48 | 51 | 56 | 40 | 53 | 50 | 52 | 50 | 55 | 42 | 39 |
| Initial strength of adhesion to a coating film | P | G | G | G | P | G | G | G | G | G | G | G | G |
| Adhesion to a coating film after exposure to light | P | P | P | P | P | G | G | G | G | G | G | G | G |

As is apparent from the results of Table 3, although trimethylhexyl phthalate contains an alkyl group having 9 carbon atoms, the adhesion between the coating film and the resin covering material containing the phthalate as a plasticizer is remarkably decreased. This can be explained as follows: the hexyl group in this phthalate ester is branched on as many as three positions and substituted by a methyl group, whereby the ester used as a plasticizer forms an aggregate (block). Thus, the hexyl group actively moves around in the resin composition to be easily transferred to the interface between the resin covering material and the coating film.

Therefore, the phthalate ester that is capable of attaining the objects of the present invention is very limited in scope and must satisfy a close tolerance with respect to the balance between ease of transfer and miscibility. Only when the limited phthalic ester is used in combination with the above-specified amount of wherein $R_1$ and $R_2$ are each an alkyl group, provided that when the total number of mols of $R_1$ and $R_2$ is 100 mol, a monomethyloctyl group is present in an amount of 10 to 60 mols, while a dimethylheptyl group is present in an amount of 30 to 70 mols.

2. The steering wheel as claimed in claim 1, wherein said resin composition comprises 100 parts by weight of the polyvinyl chloride resin, 120 to 170 parts by weight of the phthalic acid ester based plasticizer, and 20 to 30 parts by weight of the acrylonitrile-butadiene rubber.

3. The steering wheel as claimed in claim 1, wherein said coating film comprises a polyurethane based paint containing 2 to 10 wt % of nylon beads having an average particle size of 10 to 30 μm.

4. The steering wheel as claimed in claim 1, wherein a thickness of said coating film is from 10 to 50 μm.

* * * * *